3,428,513
STRENGTHENED CRYSTALLINE ARTICLE AND
METHOD OF MAKING THE SAME
Robert R. Denman, Sylvania, Ohio, assignor to Owens-Illinois Inc., a corporation of Ohio
No Drawing. Filed Apr. 24, 1964, Ser. No. 362,481
U.S. Cl. 161—1   8 Claims
Int. Cl. B32b 17/06; C03c 17/00

ABSTRACT OF THE DISCLOSURE

A crystalline ceramic article made from a certain crystallizable glass is contacted with an inorganic salt containing alkali metal ions to form a surface compression layer thereon. The resultant strengthened article is useful for dinnerware and cookware.

---

This invention relates to new strengthened ceramics made from glass, and to a method for their production.

It has been disclosed by S. S. Kistler in a paper, Journal of the American Ceramic Society, 45, No. 2, pp. 59–68, and in a corresponding British Patent 917,388 to Research Corporation, that glasses containing alkali metal ions can be exchanged using a salt bath at elevated temperatures to replace alkali metal ions in the surface of the glass with larger alkali metal ions. For instance, when this is done with a molten salt such as molten sodium nitrate using a glass containing lithium ions, Kistler discloses that the larger sodium ions replace part of the smaller lithium ions and cause the glass surface to be under compression, apparently because the larger ions are forced into the smaller spaces previously occupied by the smaller alkali metal ions. The treatment is done below the strain temperatures so that the glass cannot readjust in order to relieve the compressive stress.

It is an object of the present invention to strengthen certain ceramics made by in situ crystallization of components of the glasses by contact of the ceramic surface with a molten salt bath, such as sodium nitrate, for instance, to produce a surface compression layer.

A further object of the invention is to provide such chemically treated in situ crystallized ceramics having increased flexural strengths because of a compression layer in the surface.

Other objects, as well as aspects and advantages, of the invention will be apparent from the specification.

According to the present invention, there is provided a method for chemically producing a surface compression layer in a special ceramic made by in situ crystallization from a glass, wherein the surface of the article is contacted with a molten salt containing sodium or potassium ions, or both. In another aspect there is provided a product of the foregoing process, which process is set forth in more detail hereafter.

The method of the present invention comprises intimately contacting the surface of an article of a special ceramic composition, formed by thermal in situ crystallization of a special glass, with a hot molten inorganic salt of sodium or potassium, or both, to form a compression layer in the surface portion of the article. The special ceramic composition contains beta-spodumene or beta-spodumene-like crystalline phases, as indicated by X-ray diffraction techniques.

In the method of the invention one starts with a special glass composition having the following essential components, present in the glass in the following weight percentage liimts based on the total composition:

| | |
|---|---|
| $SiO_2$ | 68–72 |
| $Al_2O_3$ | 16–18 |
| $Li_2O$ | 3–4 |
| $MgO$ | 3–5 |
| $ZrO_2$ | 1–2 |
| $TiO_2$ | 1.2–2.4 |
| $P_2O_5$ | 0.8–2 |

In addition, small amounts of residual arsenic and antimony oxides are often present in the composition, since arsenic or antimony compounds are often used as fining or oxidizing agents. In actual practice, arsenic, expressed as $As_2O_3$, is usually present in amounts not more than 0.3 weight percent, and antimony, expressed as $Sb_2O_5$, is seldom present in amounts over 1 weight percent. Sodium oxide is often present in the glass to a certain degree from the raw materials, usually in amounts not over 1.5 or 2 weight percent. Further, when $As_2O_3$ is used as a fining agent, it is commonly added together with a little $NaNO_3$, a well-known practice. Another additive sometimes employed is F, usually in amounts not exceeding 0.3 weight percent. It is added as a salt in the usual manner and seems to aid the crystallization process somewhat when it is employed. Thus, it seems to accelerate the rate of crystallization, sometimes to such an extent that harmful exothermic effects result; hence, it is usually undesirable to have any more than 0.25 to 0.3 fluorine present, expressed as weight percent F, in the final glass composition.

The foregoing glasses are heat treated in a manner to be described hereinafter in order to obtain in situ crystallization of a large number of very small, randomly oriented crystals throughout the body. Usually, the glass and ceramic compositions employed in the present invention will have no more than 1.6 to 1.7 weight percent $ZrO_2$, since $ZrO_2$ in the higher amounts raises the liquidus temperature of the glass to a point where commercial automatic machine forming methods are uneconomical because of excessive wear of furnace refractories and short life of mold materials. Thus, while short campaigns can be maintained with 2 weight percent $ZrO_2$, the cost of replacing furnace refractories and the very short mold life with present mold materials usually makes the use of the higher amounts of $ZrO_2$ economically very undesirable in commercial practice.

The present glass compositions can be melted in high quality, high alumina refractories such as Monofrax M in gas fired furnace at temperatures of about 2900° F. The glasses are then formed into objects or articles (such as dinnerware and cookware) by conventional methods, such as press forming, blowing and casting.

The formed glass article is then heat treated to thermally crystallize in situ many small crystals. The glass is heat treated, first, at a low temperature to form many nuclei or crystallites, and thereafter at higher temperature to complete crystallization to the desired degree. The optimum heat treatment schedule depends, as will be understood, on the particular glass composition, as well as the final properties desired. Therefore, it is not possible to specify a heat treatment schedule that will be optimum for all the glasses employed in the invention. However, it is usually preferred that the first-mentioned low temperature heat treatment be in the region near the maximum rate of nuclei or crystallite formation, wherein "nuclei" are defined as submicroscopic precursors of crystalline species or as a finely dispersed submicroscopic immiscible glassy phase. It is difficult to measure directly the range of temperatures in which the relatively high rate of nuclei formation occurs, or in other words where the optimum temperature for the initial heat treatment is to be located. However, this temperature usually lies in the range from the annealing point of the glass to 250° F. above the annealing point of the glass. The annealing point temperature can be determined by ASTM designation C336–54T, with the testing apparatus being calibrated using fibers of standard glasses having known annealing and strain points as specified and published by the National Bureau of Standards.

While the high rate of nuclei formation temperature range is difficult to measure directly, the optimum initial heat treatment temperature can be empirically determined employing small droplets of the glass and a micro-furnace capable of very rapid temperature change and accurate temperature control. A droplet of the glass that has been cooled to below the annealing point temperature, can be rapidly heated in the micro-furnace to a specific temperature between the annealing point and 250° F. above the annealing point, and held at such temperature for a specified time interval, the length of time of heating depending again, upon the particular glass. Thus, if the glass inherently very rapidly forms nuclei, a shorter standard time at the low temperature can be used than if the nuclei are relatively only slowly formed. In any case, as an example, a droplet of the glass can be heated for 15 minutes at 40° F. above the annealing point temperature. Thereafter the droplet of glass in the micro-furnace is very rapidly heated to a predetermined crystallization temperature within the range, say, from 1800–1950° F. and held at such predetermined temperature for a specified length of time, for instance, one-half hour. This process can be repeated, using the same length of time of initial and final heating and the same temperature of final heating, but using different initial heating temperatures, say 30, 50, 60, 70 and 80° F. above the annealing point temperature. Thereafter by microscopic examination, one can determine which initial heat treatments resulted in formation of the most and finest crystals, and thus indirectly determine the range of temperatures where the maximum number of crystallization centers are formed, and where the initial heat treatment range is optimum for a particular glass.

The process of the invention thus usually comprises heat treating the formed article in an optimum initial temperature range between the annealing point and 250° F. above the annealing point temperature for a time of at least 5 minutes, usually at least 15 minutes, and thereafter heat treating at a higher crystallization temperature. The time of initial heat treatment has no upper limit; usually it is not more than 4 or 5 hours, but longer times are not in the least harmful and merely increase the cost of processing. The crystallization heat treatment stage is effected at higher temperatures in the range from about 1800 to 2100° F. with a sufficient length of time of heating in this range to effect in situ crystallization to the extent that the resulting glass-ceramic product has a lineal coefficient of thermal expansion less than $20 \times 10^{-7}/°$ C. and no more than sixty percent that of the original glass over the range from 25 to 300° C. The overall heat treatment chosen, that is, the initial or nucleation heat treatment and the crystallization heat treatment results in a multitude of very small, randomly oriented, substantially homogeneously dispersed crystals, essentially all of which crystals are in their largest lineal dimension less than 25 microns across.

In order to obtain a ceramic body or shaped article having as a main crystalline phase spodumene or spodumene-like crystalline phases as indicated by X-ray diffraction techniques, the crystallization heat treatment includes a time interval of at least 15 minutes in the range of about 1800–2100° F. Times in this temperature range can vary widely from 15 minutes up to 3 or 4 hours or even more, but times are normally not over 2 hours in the range from 1800–2100° F. It will be understood that longer times are usually employed at lower temperatures and vice-versa. Of course, the optimum time and temperature for the crystallizing heat treatment depends in part on the glass composition and its initial heat treatment. As will be understood, when going from the initial heat treatment temperature to the higher crystallization temperature of about 1800–2100° F., it is usually preferred to proceed slowly enough so that appreciable crystallization takes place in the intermediate range, at least to such a degree that a rigid crystalline network is formed that prevents the article from slumping. It appears that, in this intermediate temperature range, beta-eucryptite or beta-eucryptite-like crystalline forms usually appear, and thereafter are in some manner converted to beta-spodumene or beta-spodumene-like crystalline forms in the higher temperature range. The entire heat-treatment can be effected using slowly and continuously rising temperatures, or the heat treatment can have several plateaus of heat treatment temperatures, as will be understood. In any event, the crystallization heat treatment in the temperature range from 1800 to 2100° F. is effected for a time interval of sufficient length to result in an at least partially crystalline ceramic having an average lineal coefficient of thermal expansion less than $20 \times 10^{-7}/°$ C. over the range from 25 to 300° C. and no more than 60% of the expansion coefficient of the starting material glass before the in situ crystallization.

The products of such heat treatments are called "crystalline," "ceramics" or "crystalline ceramics" and they are the base material special ceramics that are treated with molten salts according to the invention. They are, in fact, at least partially crystalline. They have a porosity of zero and the entire interior of the ceramic contains a multitude of randomly oriented crystals. There is, however, no intent to imply that such "crystalline ceramic" products contain more crystalline material than glassy material either by volume or by weight. It now appears that it would be extremely difficult in these base compositions to show the actual percentage of crystalline material, or to show whether or not the "glassy" material predominates over the "crystalline" material, in any crystallized composition actually containing even approximately equal amounts of crystalline and glassy phases. However, it is believed that these crystalline ceramic products, which are treated with the molten salts according to the method of the invention, even the very high crystallized products, contain a residual glassy phase because they have a zero porosity.

The base in situ "crystalline ceramic" products of the heat treatment contain as predominant crystalline species, lithium-containing crystalline phases, including beta-spodumene or beta-spodumene-like crystalline phases, and, if the crystallization heat treatment has not been too long or at too high a temperature, beta-eucryptite or beta-eucryptite-like crystalline species may also be present, but apparently in lesser amounts than the spodumene-type crystalline phases. In any case, these lithium containing crystalline phases are present in greater amounts by volume than any other crystalline material which is present in the "crystalline ceramic" base materials resulting from the crystallization heat treatment steps.

In any case, the base crystalline ceramic products of the crystallizing heat treating step have the oxide composition, of course, set forth for the glasses hereinbefore.

In the method of the invention the so crystallized ceramic products are heated in intimate contact with the molten salt in a temperature range from about 500 to about 1000° F. for a period of time necessary to produce a compression layer in the surface of the product. Presence of the compression layer can be detected by making thin sections of a cross-section of the chemically treated article. These can be mounted on microscope slides and examined in the usual manner, using polarized light and a quartz red line compensator. Times of heating in contact with the molten salts are usually from about 5 minutes to about 10 hours, although longer or shorter times can be employed. More generally, times are in the range from about one-half hour to about 5 hours, depending on the depth of the compression layer desired. It will be understood that a very thin compression layer, of the order of 10–20 microns, will give some added strength, but if the article is one which will be subjected to much abrasion and scratching in use, the compression layer may easily be cut through at various points so that the added strength of the compression layer would then be substantially ineffective because of the weakness at the point of penetration through the compression layer. Therefore, for most uses a depth of compression layer of about 40–50 microns or more is appropriate.

Various molten salts can be employed in the present method, such as the sodium and potassium nitrates, either separately or in admixture, as used by Kistler in his treatment of glasses. Other inorganic molten salts containing sodium or potassium ions, or both, are also suitable. As an example there can be mentioned a well-known transfer salt mixture containing about 40% sodium nitrite, 7% sodium nitrate and 53% potassium nitrate. Eutectic mixtures of potassium chloride and aluminum chloride and of sodium chloride plus aluminum chloride also have low melting points well below 500° F.

It is believed, of course, that the compression layer and the strengthening effect of the treatment of the ceramic products of the present invention involves ion exchange of sodium or potassium ions for lithium ions in the ceramic product. However, it is believed unlikely that the lithium ions which are exchanged are in the glassy portion of the ceramic product, since it is felt that almost all of the lithium ions must be present as a part of the crystalline material and not in the residual glassy phase. It is theorized that part of the lithium present in the crystals are exchanged for sodium or potassium, thus creating a crystal which has larger dimensions, causing the compression layer. All of the foregoing is mere preliminary theory and it is emphasized that it is not now known what the mechanism of the compression layer formation is.

It is noteworthy that the products of the present invention, in contrast to chemically tempered glass products made according to the methods of Kistler and others, and having a significantly deep compression layer, do not shatter when sawed or cut.

It has been found that the effectiveness of the chemical surface treatment of the invention is surprisingly and highly dependent on the oxide composition of the crystalline ceramic. This will be further brought out in the specific examples which show the extremely high increase in strength obtainable with the present crystallized compositions, as compared to the effectiveness of the treatment with another spodumene-containing crystalline composition which is superficially very similar to the present starting material ceramic compositions. An important feature of the invention is the ceramic composition itself; thus, invention is not predicated merely on the proposition that the present salt bath treatment is effected using a ceramic, while Kistler discloses similar treatment of glasses.

In a specific example of the invention a glass of the following analyzed composition, with the figures rounded off, was melted in a large continuous furnace:

| Component: | Percent by weight |
|---|---|
| $SiO_2$ | 70.4 |
| $Al_2O_3$ | 16.8 |
| MgO | 4 |
| $Li_2O$ | 3.5 |
| $ZrO_2$ | 1.3 |
| $TiO_2$ | 1.8 |
| $P_2O_5$ | 1.5 |
| F | 0.09 |
| $Na_2O$ | 0.5 |
| $As_2O_3$ | 0.15 |

The glass had an annealing point temperature of approximately 1220° F. A quantity of cane was pulled from the glass melt, and a number of glass rods from the cane, about 3/16 inch in diameter were heat treated by slowly heating up to 1270° F. and then the following approximate heat treatment schedule was followed:

Heated at 1270° F. for 3 hours;
Heated from 1270 to 1280° F. over a 2-hour period;
Heated from 1280 to 1350° F. over a 1-hour period;
Heated from 1350 to 1500° F. over a period of 4 hours;
Heated from 1500 to 1600° F. over a period of 1 hour;
Heated from 1600 to 1900° F. over a period of 1.5 hours;
Heated at 1900° F. for one-half hour.

The heat treated material was then cooled to room temperature over a period of about 4 hours. The crystallized ceramic rods were glossy and white and had an average lineal coefficient of thermal expansion of about $15 \times 10^{-7}/°C$. over the range from 23 to 688° C. The original glass had a coefficient well over twice this value. A number of the rods were tested to determine their modulus of rupture, both before and after abrasion of their surfaces. Other samples of the crystallized rods were treated for the times shown in the table below by immersing in a molten bath of sodium nitrate maintained at 750° F. All of the samples treated with sodium nitrate were thereafter cooled, washed and dried. Cooling was effected slowly enough to avoid appreciable thermal tempering effects. These samples were then also tested to determine the depth of the compression layer, and to determine their modulus of rupture, both before and after abrasion. For all of the samples abraded, the abrasion procedure was to tumble the samples for fifteen minutes in a ball mill with number 12 silicon carbide grit. The table below summarizes the results:

TABLE I

| Time | Stress | Depth | MR unabraded | MR abraded |
|---|---|---|---|---|
| Untreated | | | 23,800 | 16,900 |
| Treated ½ hr | Compressive | 27 | 100,000 | 27,700 |
| Treated 3 hrs | do | 72 | 96,000 | 78,500 |

The modulus of rupture tests are all averages for a number of rods.

It will be noted that the already quite strong untreated ceramic showed an almost five-fold increase in modulus rupture, particularly in the unabraded samples. The results with the abraded rods are of most interest because most articles of commerce will be subjected to abrasion. It will be noted that even the short salt treatment time resulted in great increases in strength, but that the severity of the abrasion apparently resulted in cutting through most of the compression layer, thereby lowering the strength. Note that the sample treated for three hours, and having a deeper compression layer, loses very little of its strength upon abrasion. The modulus of rupture value of 78,500, obtained at the three hour treatment on severely abraded samples, is indeed surprising and remarkable, being many times that of the strongest known glasses.

To illustrate how highly dependent the present process is on the oxide composition of the in situ crystallized ceramic product, the following example is presented.

A glass composition was melted in a platinum crucible in a gas fired furnace at about 3100° F. The composition, rounded off, was as follows:

| Component: | Weight percent |
|---|---|
| $SiO_2$ | 70.1 |
| $Al_2O_3$ | 17.5 |
| MgO | 2.6 |
| $TiO_2$ | 4.7 |
| $Li_2O$ | 2.9 |
| ZnO | 0.7 |
| $ZrO_2$ | 0.3 |
| $Na_2O$ | 0.5 |
| $Sb_2O_3$ | 0.7 |

Again, glass rods of about 3/16 inch diameter were made and were heat treated to produce high quality, white, glossy ceramic products according to the following optimum heat treatment schedule for this glass:

| Temperatures, °F.: | Hours |
|---|---|
| 1300 | 1 |
| 1350 | 1 |
| 1400 | 1 |
| 1450 | ½ |
| 1500 | ½ |
| 1550 | ½ |
| 1600 | ½ |
| 1950 | ½ |

A portion of the ceramic rods were tested to determine their modulus of rupture without treating in molten salt, using both abraded and unabraded rods. The rest of the rods were treated as before in a molten sodium nitrate bath at 750° F. for 3 hours, cooled, washed and dried, and then also tested for their flexural strengths, abraded and unabraded. Again, the results are the average of a number of modulus of rupture tests. The results are shown in the following table:

TABLE II

| | Time | Stress | Depth | MR unabraded | MR abraded |
|---|---|---|---|---|---|
| Untreated | | | | 24,000 | 11,400 |
| Treated | 3 hrs | Compressive | 40μ | 50,500 | 18,000 |

It will be noted that the unabraded samples show only a doubling of modulus of rupture values, as a result of 3 hours in the molten salt bath at 750° F., compared to the more than four-fold increase in Table I. More importantly, abraded values show less than a 60 percent increase in flexural strength and a 40 micron depth compression layer. In Table I a sixty percent increase in abraded strength is shown for a mere one-half hour heat treatment even though the depth of the compressive layer was only 27 microns. As to the three hour treated and abraded samples, Table I shows a 360 percent increase while Table II shows only a 60 percent increase.

In another example of the invention a glass of the following composition.

| Component: | Percent by weight |
|---|---|
| $SiO_2$ | 70 |
| $Al_2O_3$ | 17 |
| MgO | 4.2 |
| $Li_2O$ | 3.6 |
| $TiO_2$ | 1.7 |
| $ZrO_2$ | 1.4 |
| $P_2O_5$ | 1.5 |
| F | 0.1 |
| $Na_2O$ | 0.5 |
| $As_2O_3$ | 0.1 | was melted and formed into rods as in the first example, and these rods were heat treated according to the same schedule as set forth in that example.

A portion of the white and glossy crystalline ceramic rods resulting where abraded and tested for flexural strength as before, except that 30 grit silicon carbide was used.

Another portion of the rods were treated with a sodium nitrate bath as before, but at 950° F. for only 2 hours. These rods were also abraded as before, except that 30 grit silicon carbide was used. The untreated ceramic rods had average flexural strengths of 31,500 p.s.i. for unabraded rods and 15,680 p.s.i. for abraded rods. The treated and abraded rods had average modulus of rupture values of 60,000 p.s.i., nearly a four-fold increase.

The flexural strengths of modulus of rupture values were determined using a Tinius-Olsen testing machine. This machine applies a measured load through a single knife edge to the center of a 4-inch long sample of cane supported on two knife edges (3-point loading). The load is applied at a constant rate of 24 pounds per minute until failure occurs, with a marker indicating the highest load applied to the point of failure. A dial micrometer calibrated in inches and equipped with a bar contact instead of a point contact is used to measure the maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{Load (lbs.)} \times 8 \times \text{span (in.)}}{(D_1^2 \times D_2)\pi}$$

The modulus of rupture in this formula gives the flexural strength in pounds per square inch of cross sectional area at failure.

As will be evident to those skilled in the art, modifications of this invention can be made or followed in the light of the foregoing disclosure without departing from the spirit and scope of the disclosure or from the scope of the claims.

I claim:
1. An at least partially crystalline ceramic article having a surface compression layer, said article being formed by
 (a) making an article of a thermally crystallizable glass having a composition consisting essentially of the following components, present in the glass in the following weight percent ranges: $SiO_2$ 68–72, $Al_2O_3$ 16–18, $Li_2O$ 3–4, MgO 3–5, $ZrO_2$ 1–2, $TiO_2$ 1.2–2.4 and $P_2O_5$ 0.8–2,
 (b) heat treating said article under conditions, including nucleation treatment for a sufficient amount of time to form many nuclei, to form ultimately a crystalline ceramic product containing a multitude of in situ formed crystals homogeneously dispersed throughout said article, essentially all of which crystals are in their largest lineal dimension less than 25 microns across, said ceramic having an average lineal coefficient of thermal expansion less than $20 \times 10^{-7}/°$ C. over the range from 25 to 300° C. and no more than sixty percent of the expansion coefficient of said glass before said in situ crystallization, said thermal crystallization including heating said article after said nucleation treatment for at least 15 minutes at a temperature of at least 1800° F., to form a beta-spodumene-like crystalline phase, and
 (c) intimately contacting the surface of said crystalline ceramic article with a molten salt containing alkali metal ions selected from the group consisting of sodium ions and potassium ions and being capable of substituting said alkali metal ions for lithium ions in an ion-exchangeable glass, said contact between the salt and the surface of the crystalline ceramic being at an elevated temperature and for a period of time sufficient to provide said surface compression layer of the ceramic article.
2. The article according to claim 4 wherein said molten salt contains sodium ions and wherein $ZrO_2$ is present in the range of 1 to 1.7 weight percent.
3. The article according to claim 2 wherein the molten salt is sodium nitrate.
4. An article according to claim 1 wherein the nucleation treatment includes maintaining said article for at least five minutes at a temperature between the annealing point of said glass and about 250° F. above said annealing point and wherein said article after said contact with the molten salt has an abraded flexural strength greater than the unabraded flexural strength of said article with the same heat treatment but without the contact with he molten salt.
5. A method of making an at least partially crystalline ceramic article having a high flexural strength which comprises
 (a) making an article of thermally crystallizable glass having a composition consisting essentially of the following components, present in the glass in the following weight percent ranges:

| | |
|---|---|
| $SiO_2$ | 68–72 |
| $Al_2O_3$ | 16–18 |
| $Li_2O$ | 3–4 |
| $MgO$ | 3–5 |
| $ZrO_2$ | 1–2 |
| $TiO_2$ | 1.2–2.4 |
| $P_2O_5$ | 0.8–2 |

(b) heat treating said article under conditions, including nucleation treatment for a sufficient amount of time to form many nuclei, to form ultimately a crystalline ceramic product containing a multitude of crystals substantially homogeneously dispersed throughout said article, essentially all of which crystals are in their largest lineal dimension less than 25 microns across, said crystalline ceramic having an average lineal coefficient of thermal expansion less than $20 \times 10^{-7}/°$ C. over the range from 25 to 300° C. and no more than sixty percent of the expansion coefficient of said glass before said in situ crystallization, said heat treating including heating said article after said nucleation treatment for at least 15 minutes at a temperature of at least 1800° F., to form a beta-spodumene-like crystalline phase, and (c) contacting the surface of said crystalline ceramic article with a molten inorganic salt containing alkali metal ions selected from the group consisting of sodium ions and potassium ions and being capable of substituting said alkali metal ions for lithium ions in an ion-exchangeable glass, at an elevated temperature and for a period of time until a surface compression layer is formed within the surface of said article.

6. The method according to claim 5, wherein the contacting of the surface of said crystalline ceramic article is with a molten inorganic salt that contains sodium ions and wherein $ZrO_2$ is present in the range 1 to 1.7 weight percent.

7. The method according to claim 5 wherein the glass that is heat treated to form the crystalline ceramic article has an analyzed composition on a weight percent basis of 70.4 $SiO_2$, 16.8 $Al_2O_3$, 4 $MgO$, 3.5 $Li_2O$, 1.3 $ZrO_2$, 1.8 $TiO_2$, 1.5 $P_2O_5$, 0.09 F, 0.5 $Na_2O$, and 0.15 $As_2O_3$, the thermal in situ crystallization, after slowly heating up the glass article to 1270° F. is as follows: heated at 1270° F. for 3 hours, heated from 1270 to 1280° F. over a 2-hour period, heated from 1280 to 1350° F. over a 1-hour period, heated from 1350 to 1500° F. over a period of 4 hours, heated from 1500 to 1600° F. over a period of 1 hour, heated from 1600 to 1900° F. over a period of 1.5 hours, and heated at 1900° F. for one-half hour, and the contact of said crystalline ceramic article with a molten inorganic salt in an immersion for 3 hours of the crystalline ceramic article in a molten bath of sodium nitrate maintained at 750° F.

8. The method according to claim 5 wherein the nucleation treatment includes maintaining said article for at least five minutes at a temperature between the annealing point of said glass and about 250° F., above said annealing point and wherein said article after said contact with the molten salt has an abraded flexural strength greater than the unabraded flexural strength of said article with the same heat treatment but without the contact with the molten salt.

References Cited

UNITED STATES PATENTS

| | | | |
|---|---|---|---|
| 2,779,136 | 1/1957 | Hood et al. | 65—30 |
| 3,096,159 | 7/1963 | Van Cott | 264—56 |
| 3,157,522 | 11/1964 | Stookey | 65—33 |
| 3,218,220 | 11/1965 | Weber | 161—1 |

OTHER REFERENCES

Kistler: "Stresses in Glass Produced by Nonuniform Exchange of Monovalent Ions," J. of Amer. Cer. Soc., vol. 45, No. 2, pp. 59–68, February 1962.

DONALL H. SYLVESTER, *Primary Examiner.*

F. W. MIGA, *Assistant Examiner.*

U.S. Cl. X.R.

65—30, 33; 106—39